(12) United States Patent
LaPlant et al.

(10) Patent No.: US 10,186,384 B2
(45) Date of Patent: Jan. 22, 2019

(54) CARBON FIBER AND PARYLENE STRUCTURAL CAPACITOR

(71) Applicant: Honeywell Federal Manufacturing & Technologies, LLC, Kansas City, MO (US)

(72) Inventors: Steven Todd LaPlant, Kansas City, MO (US); Daniel John Salzman, Lee Summit, MO (US)

(73) Assignee: Honeywell Federal Manufacturing & Technologies, LLC, Kansas City, MO (US)

(*) Notice: Subject to any disclaimer, the term of this patent is extended or adjusted under 35 U.S.C. 154(b) by 209 days.

(21) Appl. No.: 14/985,536

(22) Filed: Dec. 31, 2015

(65) Prior Publication Data

US 2017/0194107 A1 Jul. 6, 2017

(51) Int. Cl.
*H01G 11/24* (2013.01)
*H01G 11/84* (2013.01)
*H01G 11/12* (2013.01)
*H01G 11/40* (2013.01)
*H01G 11/82* (2013.01)

(52) U.S. Cl.
CPC ............ *H01G 11/24* (2013.01); *H01G 11/12* (2013.01); *H01G 11/40* (2013.01); *H01G 11/82* (2013.01); *H01G 11/84* (2013.01); *Y02E 60/13* (2013.01)

(58) Field of Classification Search
CPC ............ H01G 4/30; H01G 4/008; H01G 4/10; H01G 4/12; H01G 11/24; H01G 11/28; H01G 11/78; H01G 11/84
See application file for complete search history.

(56) References Cited

U.S. PATENT DOCUMENTS

| | | | | |
|---|---|---|---|---|
| 4,737,889 A | * | 4/1988 | Nishino | H01G 9/155 162/138 |
| 5,828,132 A | * | 10/1998 | Eissa | H01L 21/312 257/642 |
| 5,898,561 A | * | 4/1999 | Mandelcorn | H01G 4/12 29/25.42 |
| 6,981,671 B1 | | 1/2006 | Baron et al. | |
| 7,864,505 B1 | | 1/2011 | O'Brien et al. | |
| 8,760,844 B2 | | 6/2014 | Baron et al. | |
| 8,890,223 B1 | * | 11/2014 | Bonifield | H01L 27/0288 257/296 |
| 8,926,933 B2 | | 1/2015 | Zhang et al. | |
| 2009/0290314 A1 | * | 11/2009 | Bedinger | H01L 23/3192 361/748 |
| 2015/0162140 A1 | | 6/2015 | Hucker et al. | |
| 2015/0348712 A1 | * | 12/2015 | Lee | H01G 4/30 174/260 |

* cited by examiner

*Primary Examiner* — Nguyen Ha
(74) *Attorney, Agent, or Firm* — Hovey Williams LLP

(57) ABSTRACT

A structural capacitor and method for manufacturing the structural capacitor. A first layer of nonconductive fiber glass may be formed into a desired shape of the structural capacitor, and then a conductive layer made of carbon fiber pre-impregnated material may be placed on the fiber glass layer. A dielectric layer of parylene may then be coated onto the conductive layer using a conformal vapor deposition process. More conductive and dielectric layers may be added in alternating succession until desired structural and/or electrical properties are achieved. A final layer of fiber glass may then be applied and the resulting structural capacitor may be cured.

20 Claims, 2 Drawing Sheets

CARBON FIBER AND PARYLENE STRUCTURAL CAPACITOR

BACKGROUND

Figure 1:
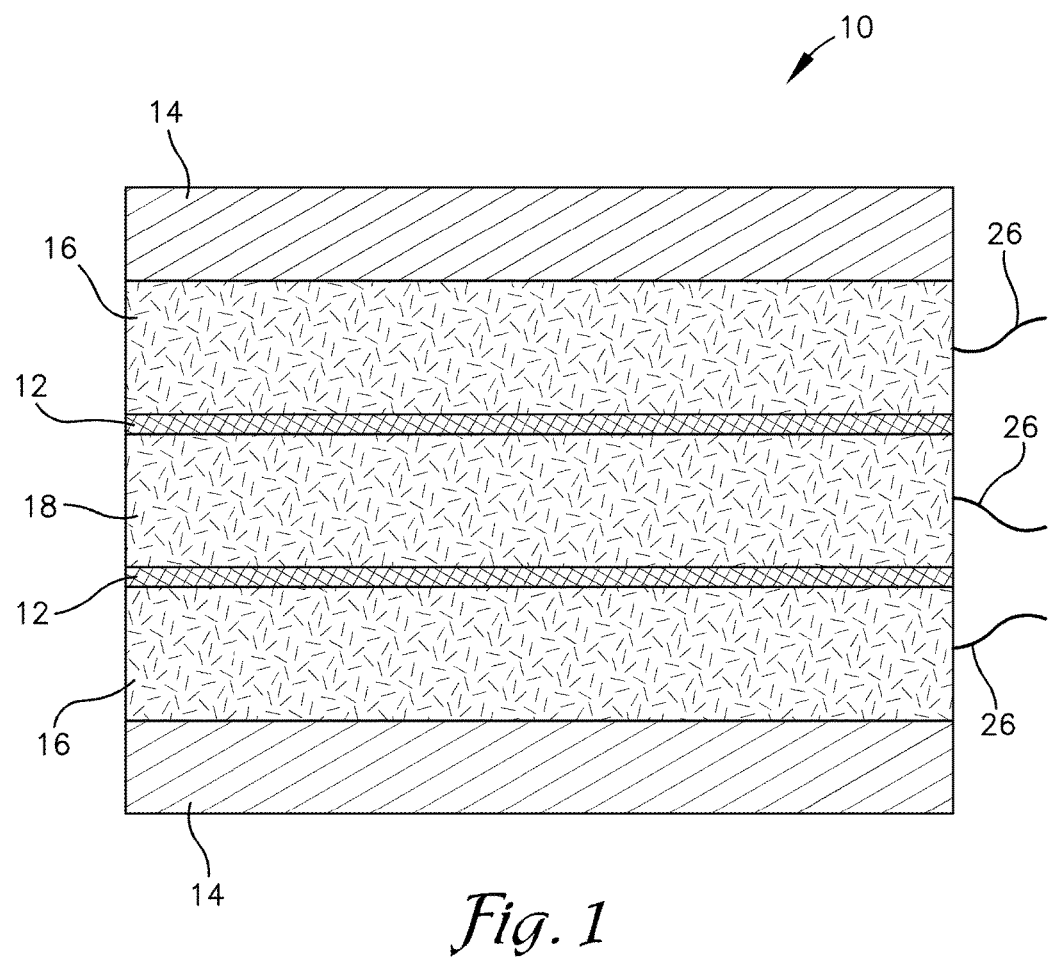

Energy storage materials are needed in many applications for storing and rapidly transferring energy. Capacitors, such as supercapacitors, can recharge and transfer energy faster than conventional batteries, but due to their reduced storage capacity, these capacitors typically need to be much larger and heavier than equivalent lithium-ion batteries. Thus, structural capacitors have been developed that act as both energy storage and structural supports to better utilize an electronic device's limited space. However, these structural capacitors are still often too heavy and thick for use in some small electronic devices.

This background discussion is intended to provide information related to the present invention which is not necessarily prior art.

SUMMARY

Embodiments of the present invention solve the above-mentioned problems and provide a distinct advance in the art of structural capacitors. A structural capacitor constructed in accordance with embodiments of this invention may provide more capacitance and structural strength, with a reduced thickness and weight compared to prior art structural capacitors. The structural capacitor may be made of several layers of materials attached together conforming to a desired shape. The number of layers may depend on the desired electrical and structural properties. An exterior layer may be made of a rigid, nonconductive material such as fiber glass. Interior layers may be made of one or more conductive composite materials such as carbon fiber pre-impregnated material and one or more dielectric layers made of parylene. The conductive and dielectric layers may be arranged in alternating succession. In some embodiments of the invention, the parylene may have a thickness between 0.0006 inches and 0.002 inches. The parylene may include different types of parylene, such as parylene N, parylene C, and parylene D.

According to another embodiment of the invention, a structural capacitor may be manufactured using parylene. The method may include the steps of forming a first layer made of a structural material into a desired shape using a mandrel or mold and placing a conductive layer made of conductive carbon fiber pre-impregnated material on the first layer. The method may also include a step of placing a dielectric layer made of parylene on the conductive layer, via conformal vapor deposition or the like. The method may then repeat these steps of adding conductive layers and dielectric layers in alternating succession until a desired electrical property or structural property is achieved. In some embodiments, the method may further include applying a last layer made of structural material to a final conductive layer of the structural capacitor. Other embodiments of the invention may also include masking and demasking to prevent parylene from being placed in undesired locations.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

DRAWINGS

Figure 2:
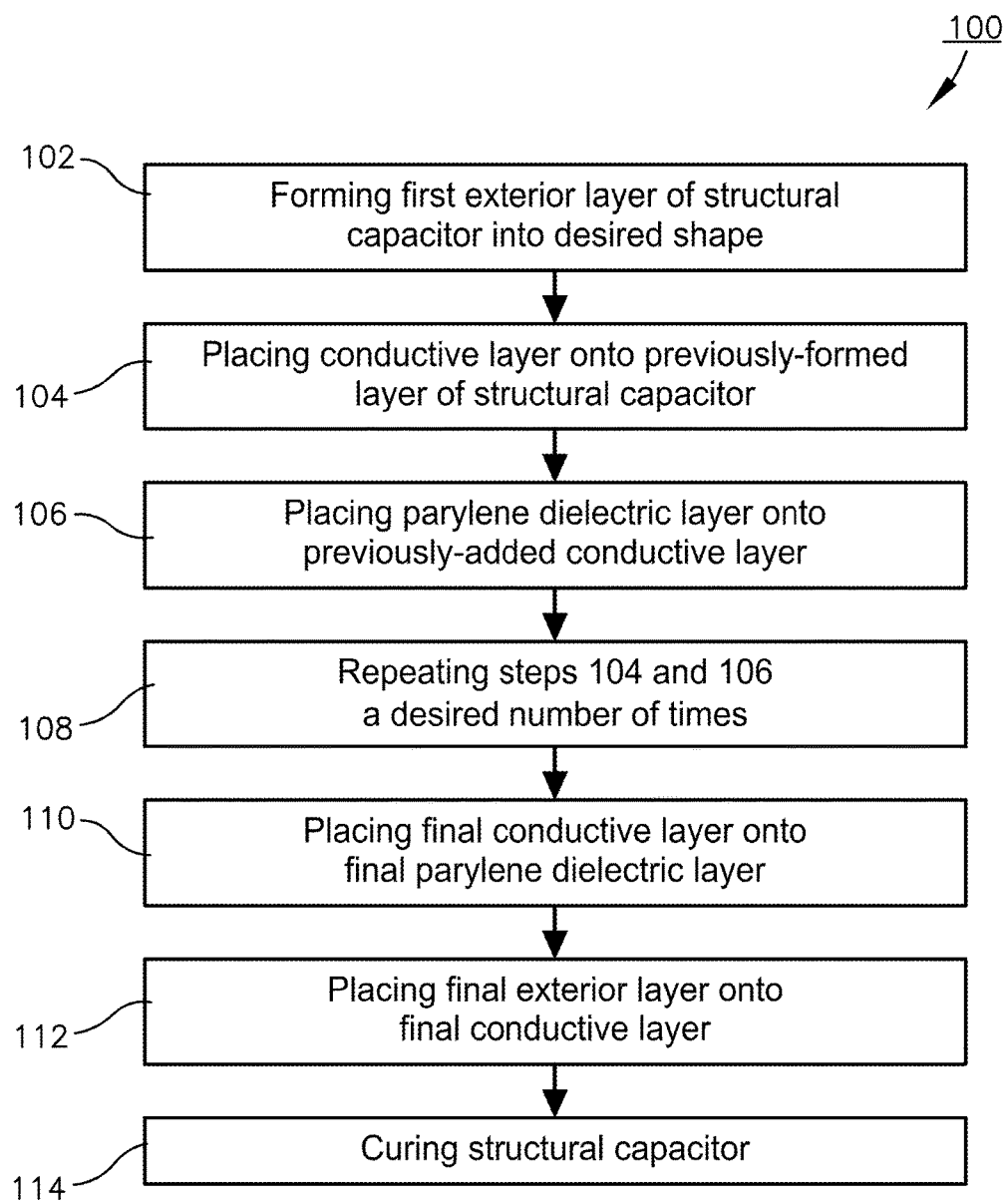

Embodiments of the present invention are described in detail below with reference to the attached drawing figures, wherein:

FIG. 1 is a structural capacitor constructed in accordance with embodiment of the present invention; and FIG. 2 is a flowchart of a method of making the structural capacitor of FIG. 1 in accordance with an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Embodiments of the invention, as illustrated in FIGS. 1 and 2, include a structural capacitor 10 comprising parylene dielectric layers 12, and a method 100 of manufacturing the structural capacitor 10. As illustrated in FIG. 1, the structural capacitor 10 may comprise one or more of the parylene dielectric layers 12, one or more exterior layers 14, one or more conductive layers 16,18, and one or more conductive cables 26. In general, the structural capacitor 10 may act as both energy storage and structural supports for any apparatus or device.

The parylene dielectric layers 12 are made of parylene, which is a generic name for a material also known in the art as poly-para-xylylenes. The parylene dielectric layers 12 may each be in the form of a conformal coating that provides a pin-hole free layer of dielectric. The parylene dielectric layers 12 may each have a thickness ranging from 0.0006 inches to 0.002 inches, depending on a chosen dimer type of the parylene used.

The exterior layers 14 may be made of any nonconductive, rigid, structural material, such as fiber glass. The exterior layers 14 may form outer surfaces of the structural capacitor 10, and may be shaped according to any desired application. The exterior layers 14 may insulate the conductive layers 16,18 of the structural capacitor 10.

The conductive layers 16 may be made of any conductive, rigid, structural material, including but not limited to metals, metal matrix composite material, carbon fiber, carbon fiber pre-impregnated material, or the like. In some embodiments of the invention, the conductive layers 16,18 may include a first conductive layer 16 and a second conductive layer 18. The shape of the first conductive layer 16 may conform to the shape of a first one of the exterior layers 14, and one side of the first conductive layer 16 may be flush and adjacent to that first one of the exterior layers 14. The first conductive layer 16 may be an anode or cathode of the structural capacitor 10. Another side of the first conductive layer 16, opposite the first one of the exterior layers 14, may have a first one of the parylene dielectric layers 12 conformed thereto.

Adjacent and flush to this first one of the parylene dielectric layers 12 may be one side of the second conductive layer 18. The second conductive layer 18 may be a cathode or anode of the structural capacitor 10. A final layer of the exterior layers 14 may be flush and adjacent to a surface of the second conductive layer 18 opposite one of the parylene dielectric layers 12.

In some embodiments of the invention, the parylene dielectric layers 12 and conductive layers 16,18 may be arranged in alternating succession until a desired physical and/or electrical property is achieved. The desired physical properties may include thickness, weight, or strength of the structural capacitor 10. The desired electrical properties may include capacitance of the structural capacitor 10. The final layer of the exterior layers 14 may be flush and adjacent to a last layer of one of the conductive layers 16,18.

The conductive cables 26 may be made of any conductive material known in the art. The conductive cables 26 may also be flexible and/or flat. The conductive cables 26 may be connected to the conductive layers 16,18 of the structural capacitor 10. The conductive cables 26 may be arranged in any configuration including connecting one or more cables to one or more of the conductive layers 16 on which positive charge collects, or cathodes, and connecting one or more cables to one or more conductive layers 18 on which negative charge collects, or anodes. If there are multiple anode and cathode pairs within the structural capacitor 10, the cables 26 may be configured to have multiple pairs connected in parallel or series, depending on the application. This would be analogous to having multiple capacitors connected in parallel or series. The cables 26 may also be connected to circuitry that is capable of changing the configuration of the cables 26.

In some embodiments of the invention, the various layers described above may be arranged differently, depending on the application. The shape, thickness, weight, and capacitance of the structural capacitor 10 may vary depending on the application. The applications may include installing the structural capacitor 10 onto a vehicle as body panels or structural components, such as a frame of the vehicle. The structural capacitor 10 may also be used as an airframe component on an airplane or armor plating on a military vehicle.

The flow chart of FIG. 2 depicts the steps of an exemplary method 100 for manufacturing the structural capacitor 10. In some alternative implementations, the functions noted in the various blocks may occur out of the order depicted in FIG. 2. For example, two blocks shown in succession in FIG. 2 may in fact be executed substantially concurrently, or the blocks may sometimes be executed in the reverse order depending upon the functionality involved.

The method 100 may comprise a step of forming a first one of the exterior layers 14 into a desired shape using a mandrel or three-dimensional mold, as depicted in block 102, thus forming a first layer of the structural capacitor 10. The shape may correspond to a shape of a desired structural component, such as a frame or housing, of any apparatus or device requiring electricity or otherwise designed for storage thereof.

The method 100 may also comprise a step of placing one of the conductive layers 16,18 onto a previously-formed layer of the structural capacitor 10, as depicted in block 104. For example, the previously-formed layer of the structural capacitor 10 may be the first one of the exterior layers 14 noted above or, in subsequent repetitions of this step, the previously-formed layer of the structural capacitor 10 may be one of the parylene dielectric layers 12.

The method 100 may then comprise a step of placing one of the parylene dielectric layers 12 on a previously-added one of the conductive layers 16,18 of the structural capacitor 10, as depicted in block 106. This step may comprise masking locations on the previously-added one of the conductive layers 16,18 at locations where parylene is not intended to go, in order to prevent the parylene from being unintentionally placed in those locations during conformal vapor deposition. One of the locations where the parylene may not be desired is where the cable 26 may eventually be connected. After masking, the previously-added one of the conductive layers 16,18 of the structural capacitor 10 may then be coated with parylene using a conformal vapor deposition process, forming one of the parylene dielectric layers 12 onto the structural capacitor 10. If masking is used, the previously-added one of the conductive layers 16,18 may then be demasked following step 106.

The method 100 may also comprise a step of repeating steps 104 and 106, as depicted in block 108. The number of times the method 100 repeats steps 104 and 106 may depend on the desired electrical and/or structural properties of the structural capacitor 10. The desired electrical properties may include a desired capacitance of the structural capacitor 10. The desired structural properties may include a desired thickness, weight, or strength of the structural capacitor 10.

In some embodiments of the invention, once the desired number of repetitions of steps 104 and 106 are performed, the method 100 may comprise a step of placing a final one of the conductive layers 16,18 on a final one of the parylene dielectric layers 12, as depicted in block 110. Then the method 100 may comprise placing a final one of the exterior layers 14 onto the final one of the conductive layers 16,18, as depicted in block 112. Finally, the method 100 may include a step of curing the structural capacitor 10 under vacuum and/or pressure in an autoclave 24, as depicted in block 114.

Although the curing step 114 is described herein as occurring at the end of the method 100, note that curing may take place after some or all of the steps herein. For example, after the addition of each of the conductive layers 16,18, the partially-formed structural capacitor 10 may be again shaped by the mandrel or mold and/or placed back into the autoclave to be cured under vacuum and pressure prior to step 106. Following each cure cycle, the partially or fully-formed structural capacitor 10 may then be removed from the mandrel or mold. Furthermore, in some embodiments of the invention, the step 104 may further comprise connecting the cables 26 onto the conductive layers 16,18 either before or after curing thereof. Alternatively, the cables 26 may be attached to the conductive layers 16,18 at the end of method 100 or following any other step thereof.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A structural capacitor comprising:
   an exterior layer made of nonconductive rigid material; and
   internal layers contiguous to the exterior layer, the internal layers and exterior layer together forming a structural component in an object, wherein the internal layers include:
      one or more conductive layers each made of a conductive composite material, and
      one or more dielectric layers each made of parylene, wherein the conductive layers and the dielectric layers are arranged in alternating succession.

2. The structural capacitor of claim 1, wherein the nonconductive rigid material is fiber glass.

3. The structural capacitor of claim 1, wherein the conductive composite material is carbon fiber pre-impregnated material.

4. The structural capacitor of claim 1, further comprising flat, flexible conductive cables connected to the conductive layers and configured to connect the conductive layers for testing and charging of the device.

5. The structural capacitor of claim 1, wherein a quantity of the internal layers affects the electrical properties thereof.

6. The structural capacitor of claim 1, wherein a quantity of the internal layers affects the structural properties thereof.

7. The structural capacitor of claim 1, wherein the thickness of the parylene is between 0.0006 inches and 0.002 inches.

8. The structural capacitor of claim 1, wherein the parylene is parylene N.

9. The structural capacitor of claim 1, wherein the parylene is parylene C.

10. The structural capacitor of claim 1, wherein the parylene is parylene D.

11. The structural capacitor of claim 1, wherein the structural component is a frame of a vehicle.

12. The structural capacitor of claim 1, wherein the structural capacitor forms a body panel of a vehicle.

13. The structural capacitor of claim 1, wherein the structural component is an airframe of an aircraft.

14. The structural capacitor of claim 1, wherein the structural component is armor plating of a military vehicle.

15. The structural capacitor of claim 1, wherein the structural component is a housing of an apparatus.

16. The structural capacitor of claim 1, wherein the structural component is a frame of an apparatus.

17. The structural capacitor of claim 1, wherein the structural component is a housing of a device.

18. The structural capacitor of claim 1, wherein the structural component is a frame of a device.

19. The structural capacitor of claim 1, wherein the structural component requires electricity stored on the structural capacitor.

20. A structural capacitor comprising:
   exterior layers including a first exterior layer and a last exterior layer, each made of nonconductive fiber glass material;
   internal layers including:
      one or more conductive layers made of conductive carbon fiber pre-impregnated material; and
      one or more dielectric layers made of a dielectric, wherein the dielectric is nonconductive parylene, wherein the conductive layers and the dielectric layers are arranged in alternating succession between the first layer and the last layer of the exterior layers forming a structural component of an object.

* * * * *

UNITED STATES PATENT AND TRADEMARK OFFICE
CERTIFICATE OF CORRECTION

PATENT NO. : 10,186,384 B2
APPLICATION NO. : 14/985536
DATED : January 22, 2019
INVENTOR(S) : Steven Paul LaPlant and Daniel John Salman Page 1 of 1

It is certified that error appears in the above-identified patent and that said Letters Patent is hereby corrected as shown below:

In the Specification

Column 1, Line 21, add:
-- STATEMENT REGARDING FEDERALLY-SPONSORED RESEARCH OR DEVELOPMENT
This invention was made with government support under Contract No.: DE-NA0000622 awarded by the Department of Energy. The government has certain rights in the invention. --

Signed and Sealed this
Twenty-first Day of April, 2020

Andrei Iancu
*Director of the United States Patent and Trademark Office*